No. 813,312. PATENTED FEB. 20, 1906.
D. MACFIE.
DRY METER FOR GAS, AIR, AND LIKE FLUIDS.
APPLICATION FILED JAN. 6, 1905.

WITNESSES.
Samuel Percival
Albert Jones

INVENTOR
Daniel Macfie
By Attorneys
Wheatley Mackenzie

UNITED STATES PATENT OFFICE.

DANIEL MACFIE, OF EDINBURGH, SCOTLAND.

DRY METER FOR GAS, AIR, AND LIKE FLUIDS.

No. 813,312.      Specification of Letters Patent.      Patented Feb. 20, 1906.

Application filed January 6, 1905. Serial No. 239,932.

*To all whom it may concern:*

Be it known that I, DANIEL MACFIE, a subject of the King of Great Britain and Ireland, residing at 56 St. Albans road, Edinburgh, Scotland, have invented certain new and useful Improvements in Dry Meters for Gas, Air, and the Like Fluids; and I do hereby declare the following to be a full, clear, and exact description of the invention, such as will enable others skilled in the art to which it appertains to make and use the same.

In gas-meters as ordinarily constructed the gas is allowed to pass through the meter at the pressure at which it reaches the meter and which varies according to the initial pressure at the gas-works and to the height at which the meter is fixed above or below the level of the gas-works. The pressure necessary to obtain the best results from the gas being consumed is easily ascertained. In my improved meter I combine any form of pressure governor or regulator with the ordinary mechanism of the measuring part of the meter, so that the gas passes through the governor or regulator either before or after it enters the measuring part, and the pressure at which the gas leaves the meter is thereby controlled and regulated, suitable provision being made for varying the pressure at will to suit the local conditions. The governor or regulator thus becomes a part of and is contained within the case of the meter and is not affixed to it as a separate apparatus on the meter inlet or outlet, as is generally the case.

Figure 1:
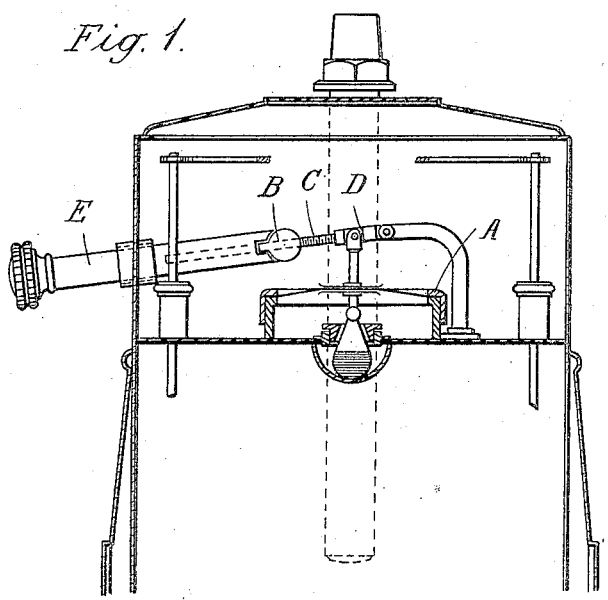
Figure 2:
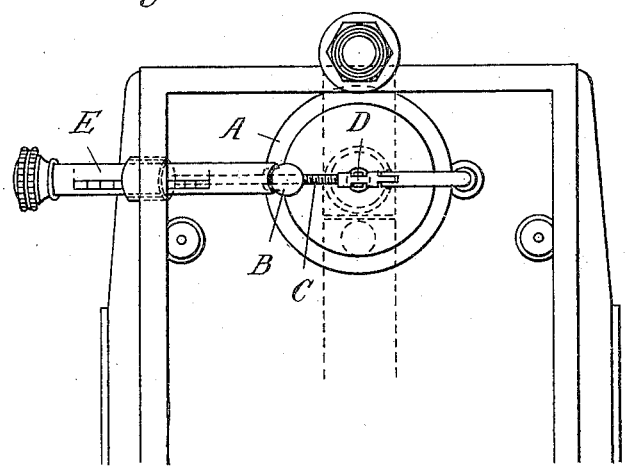

In the drawings, Figure 1 is a sectional elevation, and Fig. 2 a plan, of the upper part of my improved meter, showing the application of one form of governor or regulator; but it is evident that any other form of governor or regulator can be applied in an exactly similar manner.

In the drawings, A shows a leather diaphragm, to which the gas on the outlet side of the governor or regulator is brought, and which raises it.

B is a weight acting through the lever C on the fulcrum D, and so pressing the leather diaphragm A downward. The greater the weight upon this diaphragm the greater will be the outlet-pressure thrown by the governor or regulator. By moving the weight B nearer to or farther away from the fulcrum D the weight upon the diaphragm is decreased or increased, as required, so providing for a range of pressures. This weight B may be made to move along the screwed lever by means of a key E, inserted from the outside of the meter, upon which key E is marked the pressure at which the meter will be set, according to the position of the weight B.

What I claim, and desire to secure by Letters Patent, is—

1. The combination with an ordinary consumer's meter for the purpose of measuring gas, of an adjustable pressure governor or regulator forming an integral part of the meter and a graduated index-key extending from outside the meter to the adjustable governor.

2. The combination with an ordinary consumer's meter for the purpose of measuring gas, of a valve in the meter-way tending to close by the gas-pressure, a lever acting on the valve to open it and an adjustable weight on the lever and a graduated index-key extending from outside the meter-case and adapted to adjust the weight on the lever.

In testimony whereof I have affixed my signature in presence of two witnesses.

DANIEL MACFIE.

Witnesses:
    JOHN K. MCLAREN
    ELIZA W. YAIT.